S. SORENSON.
WOODWORKING TOOL.
APPLICATION FILED OCT. 24, 1921.
1,421,599.
Patented July 4, 1922.
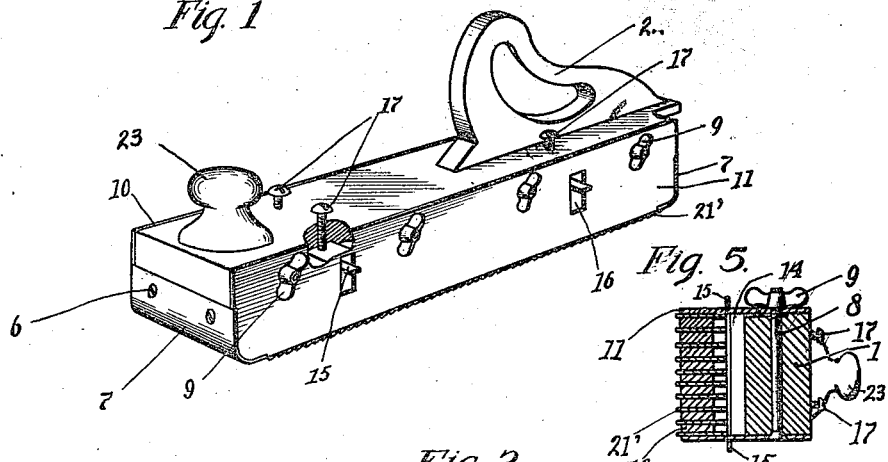
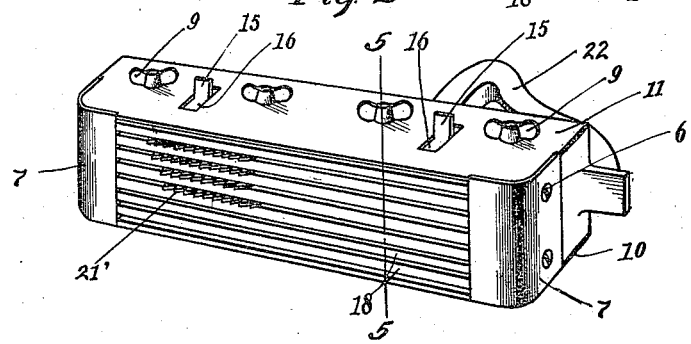
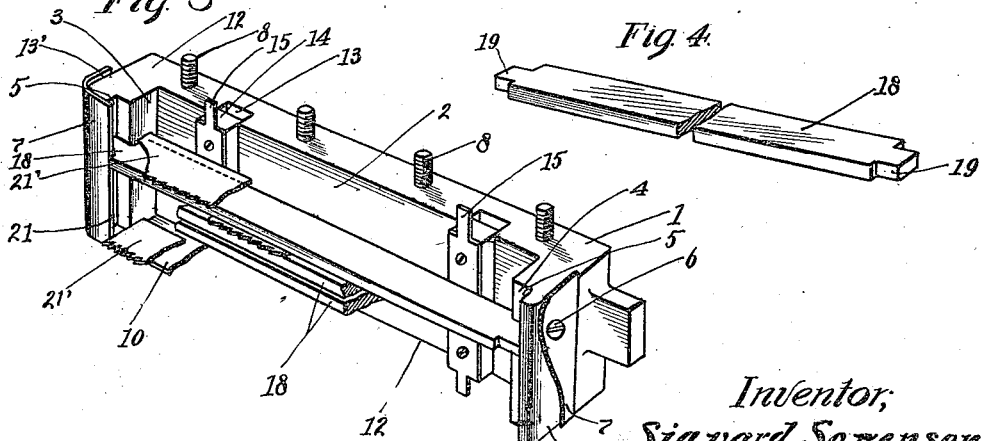
Inventor,
Sigvard Sorenson
by H. S. Johnson
his Attorney.

UNITED STATES PATENT OFFICE.

SIGVARD SORENSON, OF ST. PAUL, MINNESOTA, ASSIGNOR OF ONE-HALF TO ARIE VOLLEGRAAF, OF ST. PAUL, MINNESOTA.

WOODWORKING TOOL.

1,421,599.

Specification of Letters Patent.   Patented July 4, 1922.

Application filed October 24, 1921.   Serial No. 510,001.

*To all whom it may concern:*

Be it known that I, SIGVARD SORENSON, a subject of the King of Norway, residing at St. Paul, in the county of Ramsey and State of Minnesota, have invented certain new and useful Improvements in Woodworking Tools, of which the following is a specification.

This invention relates to wood working tools, such as planes and the like, an object of the invention being the provision of a substitute for the ordinary jack-plane, commonly used by wood workers for roughing off irregular surfaces preparatory to smoothing the same with the usual fore-plane.

In the use of an ordinary jack-plane, which is usually equipped with an ordinary cutting blade, the surface of the wood to be leveled, ordinarily becomes deeply pitted in spots, where the plane is working against the grain of the wood.

In practice, this is unavoidable, as, in fine woodwork lumber having an irregular curly grain, is preferred to straight grained lumber, because of its artistic appearance. This is particularly the case in hard wood floors, which must usually be roughed off, before scraping. The pitted spots resulting from the use of ordinary planes, cannot in all cases be completely eliminated by scraping without cutting deeper in one place than another.

An object of the present invention is to provide a cutting surface for a leveling plane, which will consist of a multitude of relatively small teeth, such as saw teeth, the device being specially constructed so that it may be shoved diagonally with respect to the long axis of the plane, without injuring the cutting elements, the protruding teeth being adapted to cut the surface after the manner of the teeth of a rasp.

A further object of the invention is to provide a device of the class described, so constructed that a multiple of ordinary commonly used hack saw blades may be used to form the cutting element of the plane, and so that each blade may be readily withdrawn and replaced from the face of the plane, without removing any of the component parts thereof.

A still further object of the invention is to provide means in a device of the class described, whereby the hack saw blades may be firmly gripped throughout their entire length to guard against lateral bending when the plane is shoved diagonally across the surface to be leveled.

As hack saw blades are tempered to a brittle hardness, and are easily snapped off by a diagonal movement, this feature of my invention is an important one, inasmuch as I have found by trial, that even a short span, of laterally unsupported saw blade, renders it liable to break at that point.

Other objects will appear throughout the specification, the invention consisting in the construction, combination and arrangement of parts hereinafter described and claimed.

Figure 1, is a perspective view of a plane embodying my invention.

Figure 2, is a perspective view of one side and the cutting face of the invention.

Figure 3 is a fragmentary perspective view, illustrating the construction of the parts and the assembling thereof, and Figure 4 is a perspective view of one of the spreader bars.

Fig. 5 is a cross section taken on the line 5—5 of Fig. 2.

Referring to Figure 3, 1 designates the frame block or stock of the plane, said block being cut away intermediate its ends to form a long section of uniform thickness having a flat undersurface 2, and transverse end walls 3, at right angles to said undersurface.

The inner transverse edge of the walls 3 are cut away to form a rectangular rabbet, the bottom 4, thereof, being parallel with the wall 2, the rabbet forming an inner shoulder 5 at opposite ends of the stock. Secured on the ends of the stock, as by means of the screws 6. and extending outwardly and preferably in a curve inwardly in parallelism with the wall 2, are the angle plates 7, which in conjunction with the wall 4 of the rabbet, form a laterally disposed open ended groove or slideway in the recess of the stock.

Extending transversely through the stock are the bolts 8, having countersunk heads and fitted with thumb nuts 9, said bolts extending through the side plates 10 and 11 which latter constitute side walls of what may be termed a recess formed by the side and end walls. The angle plates 7 project slightly beyond the parallel sides 12, of the stock as at 13', the plates 10 and 11 being formed to fit the bend of the angle plates 7 and be flush with the outer surface of the stock as indicated in Figure 1.

Thus, the plates may be firmly bolted against opposite sides of what may be termed the central portion of the stock. Disposed transversely of the stock and cut into the wall 2 of the recess, are the transverse guide ways 13, said guide ways being adapted to slidably receive the thrusts blocks 14, said blocks being faced with a metallic strip 15, extending beyond opposite sides 12 of the frame block, and through the openings 16, in the side plates, the extending ends of said strip being slidable vertically in said openings so as to be guided thereby.

Threaded in the wall 2, and extending through the latter, so as to be adjusted from the outside of the plane, are the set screws 17, which latter abut against the thrust blocks 14, whereby the latter may be fed outwardly. The outer faces of the blocks are normally positioned between the wall 3 and the bottom of the rabbet 4 for purposes hereinafter to be explained.

Slidable in the grooves formed by the wall 4 and the angle irons 7, are the spreader bars 18, the ends of said bars being cut away to form rectangular pins or tenons 19, adapted to slidingly fit into said grooves, the tenons being offset relative to the body of the bars, so that the outer edge 20 thereof, will be flush with the front face of the angle plates 7. The spreader bars may thus be slid into said groove sidewise. The faces of the wall 3, align with the respective inner edges 21 of the angle plates 7, to receive sidewise an ordinary stock size hack saw blade designated by 21', so that the latter may be slipped edgewise into position, between the spreader bars.

Thus, the device may be assembled as follows: The plate 10 is positioned and the bolts 17 projected through the frame block 1. A hack saw blade may then be inserted on the top of the blade 10 as indicated in Figure 3. A spreader bar is then placed into position, and another saw blade then added, this operation being repeated until the opening of the recess is filled. The spreader bars are made of such thickness as to bring the last hack saw blade to a position slightly above the upper side 12 of the stock, so that when the plate 11 which may be termed a clamping plate, placed over the bolts 8, and the thumb screws 9 then brought into play to bring pressure to bear on the plate 10, the spreader bars and saw blades, (which may be collectively termed a pack wherein the said saws and bars are arranged in alternate order) will be firmly clamped together, as a whole.

The device is so constructed, that the plate 15 on the thrust blocks, will rest against the backs of the several assembled saw blades, the latter being wider than the spreader bars to afford a clearance space so that the saws may be fed forwardly to the desired degree beyond the face 20 of the bars. Thus, when it is desired to adjust the saw blades for the purpose of cutting deeper into the wood, or cutting a coarser chip, the thumb screws may be temporarily loosened and the blades forced forward by means of the set screws 17.

When it is desired to renew a blade, it is only necessary to pull it out, from the face of the plane and insert another. This is a great convenience, as it can be done quickly, without in any way, disassembling the plane.

A suitable handle 22 and knob 23 are provided.

It will be noted, in Figure 5 of the drawings, that a clearance space is provided at the inner edge of the side 12 of the stock, to permit the plate 11 to rest upon the outer edge thereof, and thereby exert pressure on the stacked saw blades and spreader bars.

I claim:

1. A plane of the class described, comprising a composite stock having a rectangular recess in its under side, said stock being composed of side walls forming the sides of said recess and a central portion, bolts extending laterally through said side walls and said central portion to bolt said walls against the latter, and a plurality of saw blades and spreader bars arranged in alternate order side by side to form a pack, said pack being thicker than said central portion and extending longitudinally between and laterally against the lower portion of said walls to be thereby clamped firmly together when said walls are bolted against said central portion.

2. In a wood working tool of the class described, the combination, a long stock recessed intermediate its ends to form transverse parallel end walls, a groove parallel with the bottom of said recess, in the inner vertical face of each of said end walls adjacent the outer edge thereof, a plurality of spreader bars adapted to be superposed upon one another, fitting slidably endwise between said end walls and extending slidably into said grooves, so as to be flush with the outer edges of said walls, a plate extending between said end walls, so as to form a wall on one side of said recess, a detachable plate similar to said first named plate forming a wall on the opposite side of said recess, clamping means for detachably clamping said last named plate to said stock, and saw blades superposed in alternate order with said spreader bars, the teeth thereof projecting beyond the outer edge of the latter, said blades extending between said end walls, so that they may be inserted, from a position in front of said spreader bars, sidewise between said walls, and edgewise between said spreader bars, said superposed spreader bars and saw blades extending when assembled, into contact with said last named plate, to be clamped together, thereby, in the process of clamping said plate to said stock.

In testimony whereof I affix my signature.

SIGVARD SORENSON.